(12) United States Patent
Kim et al.

(10) Patent No.: US 11,651,674 B2
(45) Date of Patent: May 16, 2023

(54) ELECTRONIC MONITORING SYSTEM AND CONTROL METHOD THEREOF

(71) Applicant: Life Science Technology, Inc., Seoul (KR)

(72) Inventors: Jeong Hwan Kim, Seoul (KR); Min Joon Choi, Bucheon-si (KR)

(73) Assignee: Life Science Technology, Inc., Seoul (KR)

( * ) Notice: Subject to any disclaimer, the term of this patent is extended or adjusted under 35 U.S.C. 154(b) by 0 days.

(21) Appl. No.: 17/207,922

(22) Filed: Mar. 22, 2021

(65) Prior Publication Data
US 2021/0209931 A1    Jul. 8, 2021

Related U.S. Application Data

(63) Continuation of application No. PCT/KR2018/011227, filed on Sep. 21, 2018.

(51) Int. Cl.
| | | |
|---|---|---|
| *G08B 1/08* | (2006.01) | |
| *G08B 25/10* | (2006.01) | |
| *H04W 4/029* | (2018.01) | |
| *G16Y 10/80* | (2020.01) | |
| *G16Y 40/10* | (2020.01) | |

(52) U.S. Cl.
CPC ............. *G08B 25/10* (2013.01); *G16Y 10/80* (2020.01); *G16Y 40/10* (2020.01); *H04W 4/029* (2018.02)

(58) Field of Classification Search
CPC ........ G08B 25/10; G08B 21/22; G16Y 10/80; G16Y 40/10; H04W 4/029; H04W 4/80; G06N 3/02; G06Q 50/10

USPC ...................................................... 340/539.1
See application file for complete search history.

(56) References Cited

U.S. PATENT DOCUMENTS

| | | | | |
|---|---|---|---|---|
| 6,014,080 A | * | 1/2000 | Layson, Jr. | ......... G08B 21/0288 340/539.31 |
| 2007/0139207 A1 | * | 6/2007 | Agapi | ..................... G08B 21/22 702/180 |
| 2007/0171047 A1 | * | 7/2007 | Goodman | ............. G01S 5/0072 340/539.13 |
| 2008/0018458 A1 | * | 1/2008 | Derrick | .............. G08B 21/0269 455/456.1 |

(Continued)

FOREIGN PATENT DOCUMENTS

| | | |
|---|---|---|
| KR | 10-2013-0026532 A | 3/2013 |
| KR | 10-2015-0016687 A | 2/2015 |
| KR | 10-2016-0022953 A | 3/2016 |

(Continued)

*Primary Examiner* — Tai T Nguyen
(74) *Attorney, Agent, or Firm* — United One Law Group LLC; Kongsik Kim; Jhongwoo Peck

(57) ABSTRACT

An electronic monitoring system includes an electronic monitoring device that is worn on a part of the body of a person to be monitored, to acquire location information and state information; an at-home monitoring device that receives the location information and the state information provided from the electronic monitoring device and determines whether the electronic monitoring device is at home, on the basis of the location information; and a control center that receives the location information and the state information from at least one of the electronic monitoring device or the at-home monitoring device to manage the person to be monitored.

9 Claims, 11 Drawing Sheets

(56) References Cited

U.S. PATENT DOCUMENTS

2014/0191864 A1\* 7/2014 Ghazarian .............. G08B 21/22
340/539.13
2017/0150306 A1\* 5/2017 Lejeune, Jr. ....... G08B 21/0272

FOREIGN PATENT DOCUMENTS

| KR | 10-2016-0046690 A | 4/2016 |
| KR | 10-2016-0059133 A | 5/2016 |
| KR | 10-1669655 B1 | 10/2016 |

\* cited by examiner

ELECTRONIC MONITORING SYSTEM AND CONTROL METHOD THEREOF

CROSS-REFERENCE TO RELATED APPLICATION

This application is a Continuation of International Application No. PCT/KR2018/011227 filed on Sep. 21, 2018, which application is incorporated herein by reference in its entirety.

TECHNICAL FIELD

The present invention relates to an electronic monitoring system and a control method thereof, and more specifically, the present invention relates to an electronic monitoring system and a control method thereof that is capable of effectively supervising and managing a person to be monitored through an electronic monitoring device that is implemented integrally with an electronic anklet and the like and is worn on a part of the body of a person to be monitored.

RELATED ART

Recently, as sexual crimes such as violent sexual assaults are increasing day by day, voices demanding strong countermeasures against recidivism to cope with such violent crimes are increasing day by day. Thus, sex offenders who are released after the sentence of prison are required to wear a location tracking device such as an electronic bracelet or an electronic anklet for a certain period of time, so that we can figure out the radius of their activities, thereby suppressing the occurrence of recidivism, or when recidivism occurs, offenders can be easily arrested.

A person to be monitored, who is the wearer of the electronic anklet, must always carry a location tracking device, and the location tracking device continuously perceives electromagnetic waves transmitted from the ankle attachment device and provides it to the control center through a mobile communication network. If the wearer of the electronic anklet is farther away from the location tracking device by a certain distance or more or cuts the electronic anklet, an alarm sound is generated and reported to the control center through the mobile communication network. In this case, the probation office starts to take a procedure to secure personal affairs of the sex offenders to be supervised.

However, such a system has a wide error range of location information such as GPS information, and provides only information on the simple movements (for example, walking, running, lying down, stopping and the like) of a person to be monitored, so there are limitations in its usability and accuracy. In addition, there was a problem that it was not effective in lowering the recrime rate of the person to be monitored, who is the wearer of the electronic anklet, because it was not possible to preemptively cope with abnormal signs in the behavior of the person to be monitored, and it was not capable of promptly coping with the recrime of the wearer of the electronic anklet. In addition, in the conventional system, the location tracking of the person to be monitored who wears the electronic anklet is only figuring out the access to the address of the previously registered place, so that there was a problem that it is not possible to effectively warn the victim against the recidivism of the person to be monitored.

The background of the present invention is disclosed in Korean Patent Publication No. 10-1669655 (published on Oct. 26, 2016).

SUMMARY

The technical problem to be achieved by the present invention is to provide an electronic monitoring system and a control method thereof that is capable of effectively supervising and managing a person to be monitored by an out-of-home state and an at-home state of a person to be monitored by detecting the location of a person to be monitored and the state of an electronic monitoring device through an electronic monitoring device that is implemented integrally with an electronic anklet and the like and is worn on a part of the body of a person to be monitored, as well as is capable of detecting abnormal behavior by analyzing the behavior pattern of a person to be monitored.

According to one aspect of the present invention, the present invention provides an electronic monitoring system, characterized in that the electronic monitoring system comprises: an electronic monitoring device that is worn on a part of the body of a person to be monitored, to acquire location information and state information; an at-home monitoring device that receives the location information and the state information provided from the electronic monitoring device and determines whether the electronic monitoring device is at home, on the basis of the location information; and a control center that receives the location information and the state information from at least one of the electronic monitoring device or the at-home monitoring device to manage the person to be monitored.

The electronic monitoring device may comprise: a location detecting unit that detects the location information of the electronic monitoring device; a state information detecting unit that detects the state information of the electronic monitoring device; a battery that supplies an electric power source to the electronic monitoring device; a wireless communication module; and a control unit that controls the overall operation of the electronic monitoring device, but controls to provide the location information and the state information to the at-home monitoring device or the control center through the wireless communication module.

When the person to be monitored is out of home, the wireless communication module of the electronic monitoring device may transmit the location information and the state information directly to the control center through IoT communication or may transmit via the at-home monitoring device, and when the person to be monitored is at home, the wireless communication module of the electronic monitoring device may communicate with the at-home monitoring device through near field wireless communication, and the at-home monitoring device may communicate directly with the control center through IoT communication to provide the location information and the state information.

The location detecting unit may detect at least one of GPS location information, WPS information (Wifi Position system) and cell-identifier information of a wireless communication base station as the location information. The location detecting unit may set the priority in the order of GPS location information, WPS information and cell-identifier information of a wireless communication base station to provide the location information to the at-home monitoring device or the control center.

According to another aspect of the present invention, the present invention provides a method of controlling an electronic monitoring system, characterized in that the method comprises: a step in which an electronic monitoring device that is worn on a part of the body of a person to be monitored acquires location information and state information; a step in which when the electronic monitoring device is at home, the electronic monitoring device transmits the location information and the state information to an at-home monitoring device; and a step in which the at-home monitoring device transmits the location information and the state information to a control center that manages the person to be monitored.

The method of controlling an electronic monitoring system may further comprise a step in which when the electronic monitoring device is out of home, the electronic monitoring device transmits the location information and the state information directly to the control center or transmits to the control center via the at-home monitoring device.

When the person to be monitored is out of home, the electronic monitoring device may communicate directly with the control center through IoT communication or communicate with the at-home monitoring device to provide the location information and the state information, and when the person to be monitored is at home, the electronic monitoring device may communicate with the at-home monitoring device through near field wireless communication, and the at-home monitoring device may communicate directly with the control center through IoT communication to provide the location information and the state information.

The electronic monitoring device may detect at least one of GPS location information, WPS information and cell-identifier information of a wireless communication base station as the location information.

The electronic monitoring device may set the priority in the order of GPS location information, WPS information and cell-identifier information of a wireless communication base station to provide the location information to the at-home monitoring device or the control center.

The electronic monitoring system and the control method thereof according to one aspect of the present invention is capable of effectively supervising and managing a person to be monitored by an out-of-home state and an at-home state of a person to be monitored by detecting the location of a person to be monitored and the state of an electronic monitoring device through an electronic monitoring device that is implemented integrally with an electronic anklet and the like and is worn on a part of the body of a person to be monitored.

In addition, the electronic monitoring system and the control method thereof according to one aspect of the present invention prevent the occurrence of crime in advance by analyzing the behavior pattern of a person to be monitored and detecting abnormal behavior in advance, and thus can have an effect in minimizing social and economic costs that may be incurred therefrom.

DETAILED DESCRIPTION

Figure 1:
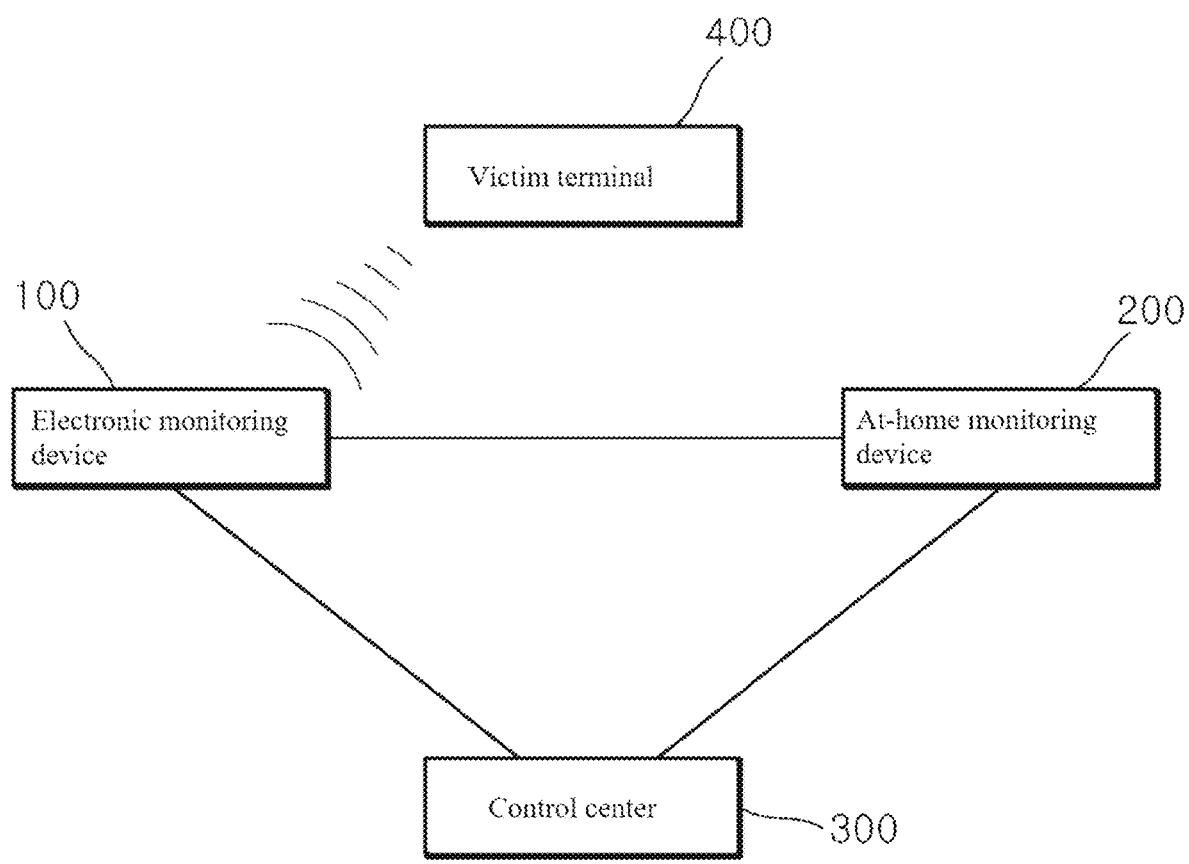
FIG. 1 is a block diagram showing the electronic monitoring system according to one embodiment of the present invention.

Hereinafter, the embodiments of the present invention will be described in detail with reference to the accompanying drawings so that those of ordinary skill in the art to which the present invention belongs can easily practice the present invention. However, the present invention can be implemented in various different forms and is not limited to the embodiments described herein. In addition, in the drawings, parts irrelevant to the description are omitted in order to clearly describe the present invention, and similar drawing symbols are assigned to similar parts throughout the specification.

Throughout the specification, when a part "includes" a certain component, it means that other components may be further included rather than excluding other components unless specifically stated to the contrary.

Figure 2:
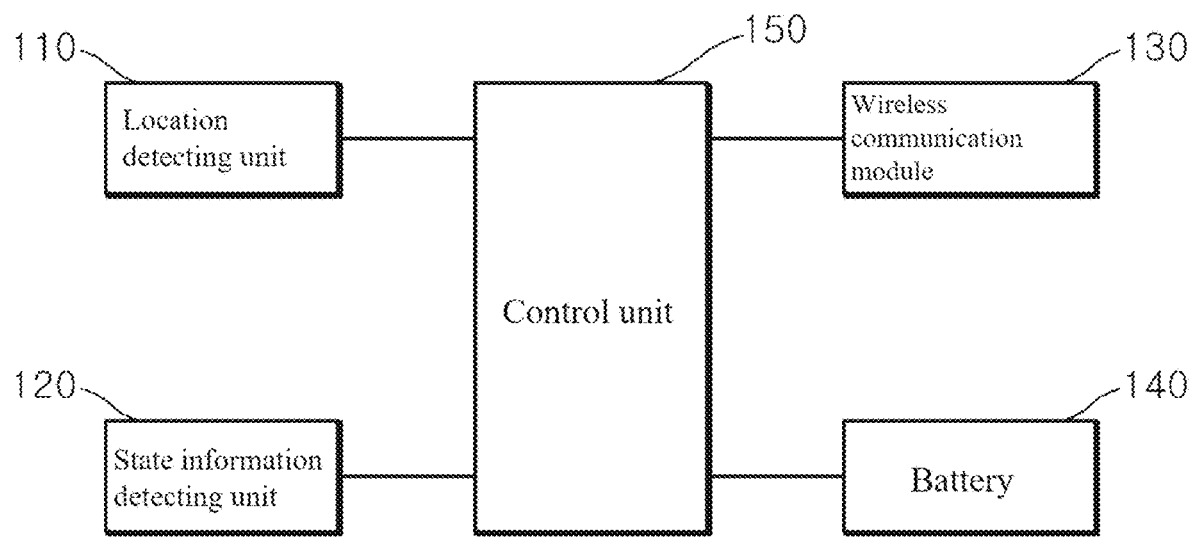
FIG. 2 is a block diagram showing the configuration of the electronic monitoring device of the electronic monitoring system according to one embodiment of the present invention.
Figure 3:
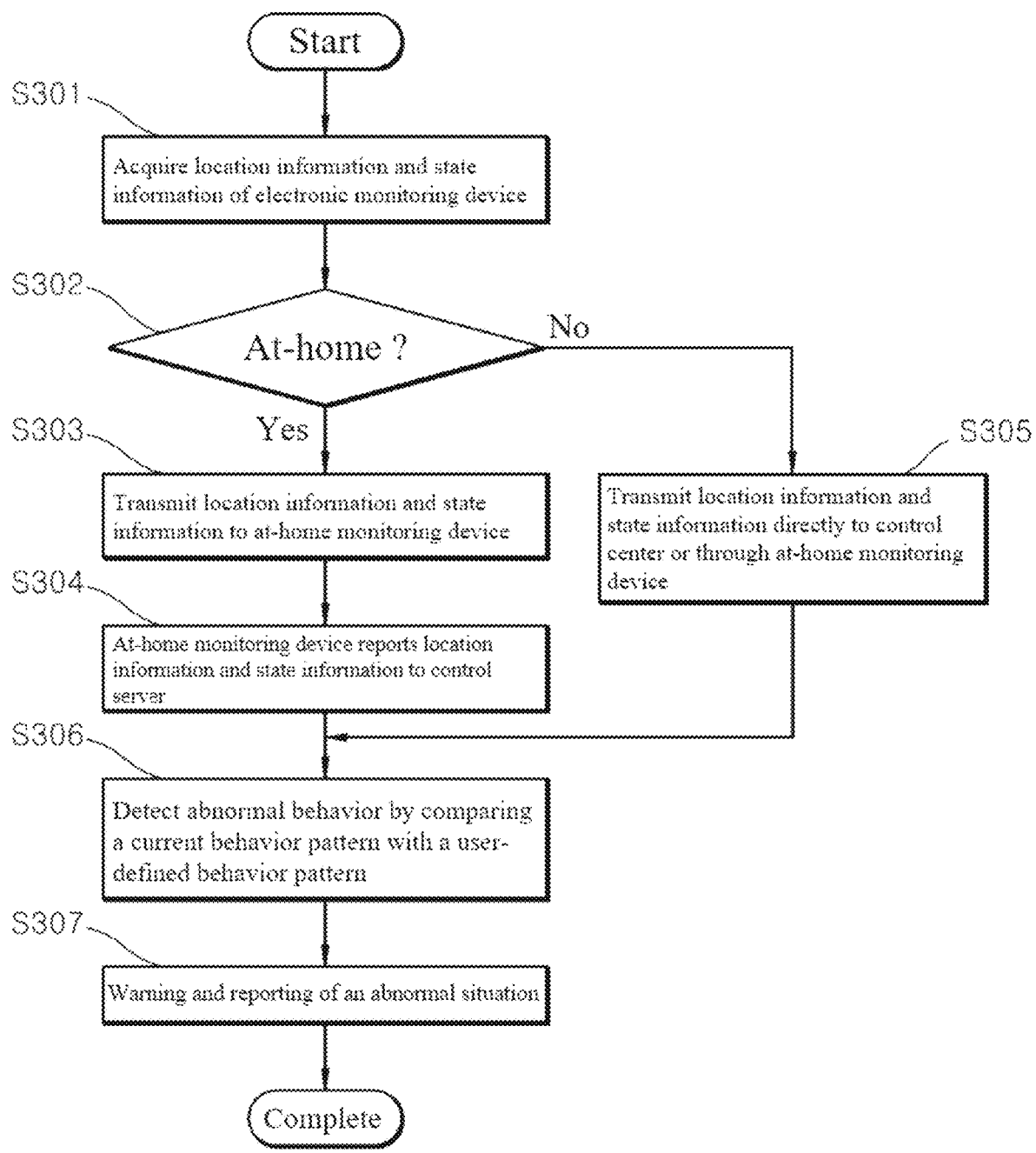
FIG. 3 is a flow chart showing a method of controlling the electronic monitoring system according to one embodiment of the present invention.
Figure 4:
FIG. 4 is a schematic diagram conceptually showing prediction of a future behavior on the basis of a user-defined behavior pattern generated in advance through deep learning using IMU positioning information as learning data.
Figure 5:
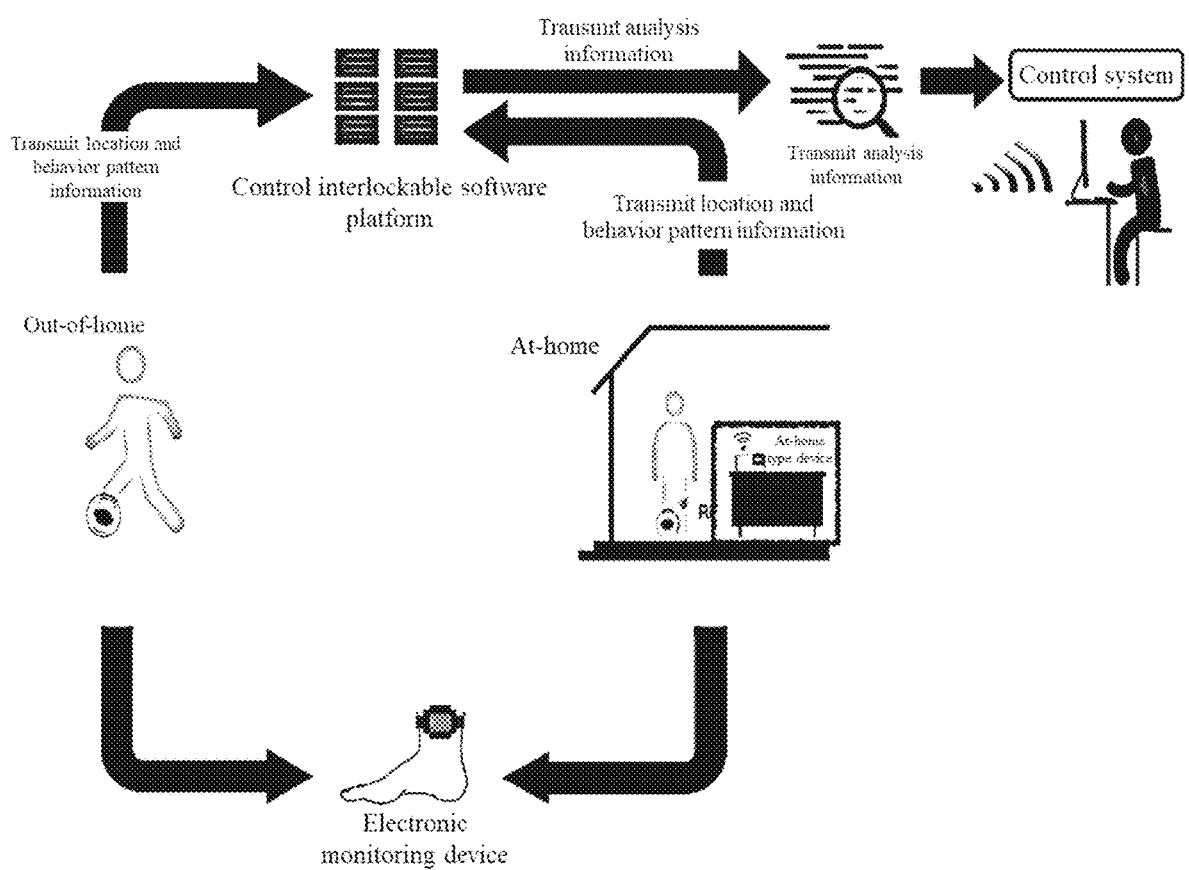
FIG. 5 is a view showing a method of providing data according to an out-of-home state or an at-home state of the electronic monitoring device in the electronic monitoring system according to the present embodiment.
Figure 6:
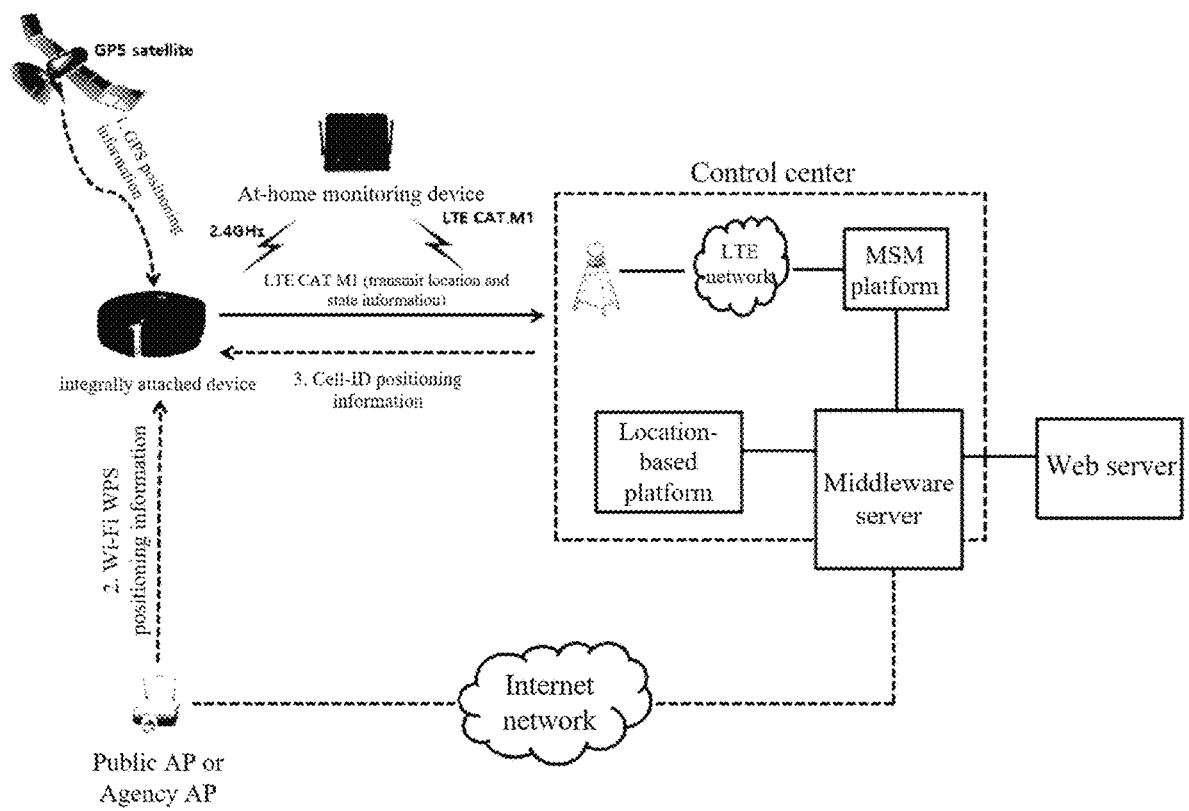
FIG. 6 is a view showing an example in which the electronic monitoring device acquires location information according to the source of the location information.
Figure 7:
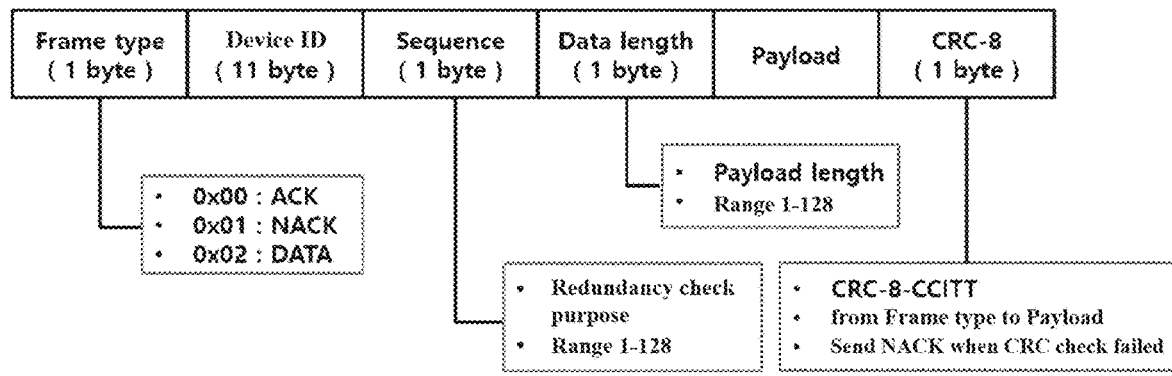
FIG. 7 is a view showing a configuration of a data frame used for communication between each device in the electronic monitoring system according to the present embodiment.
Figure 8A:
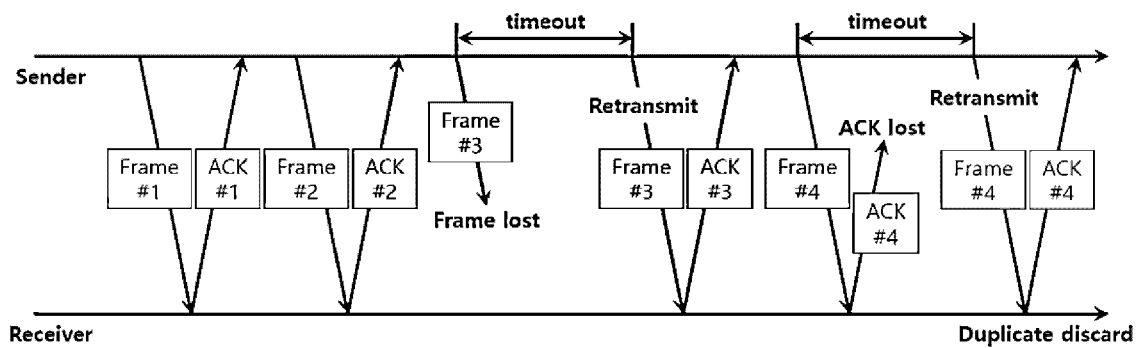
FIG. 8A is a schematic diagram explaining a data transmission method when an original frame is lost or an ACK is lost.
Figure 8B:
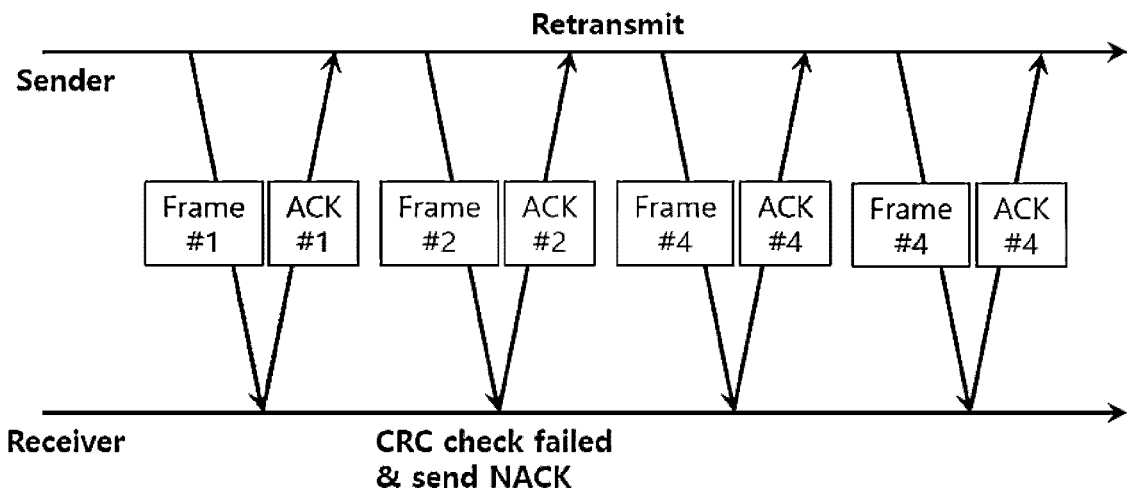
FIG. 8B is a schematic diagram explaining a data transmission method in case of a CRC check error.
Figure 9A:
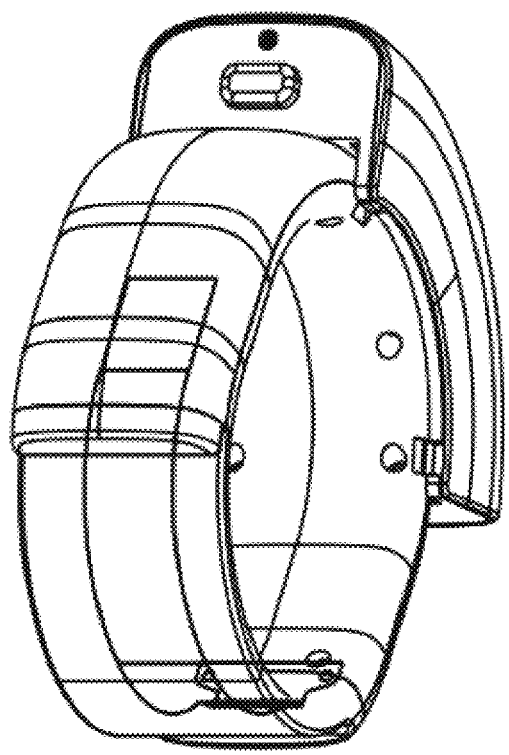
FIG. 9A is a view showing a schematic appearance of the electronic monitoring device according to the present embodiment.
Figure 9B:
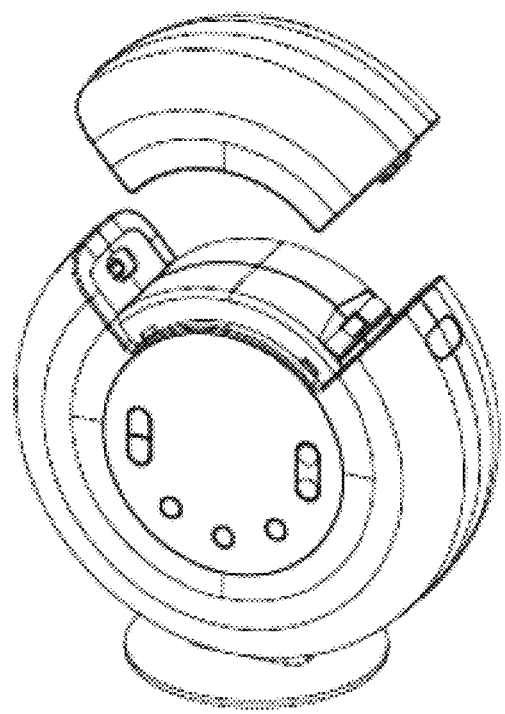
FIG. 9B is a view showing an appearance of a battery and a charging pack of the electronic monitoring device according to the present embodiment.
Figure 10:
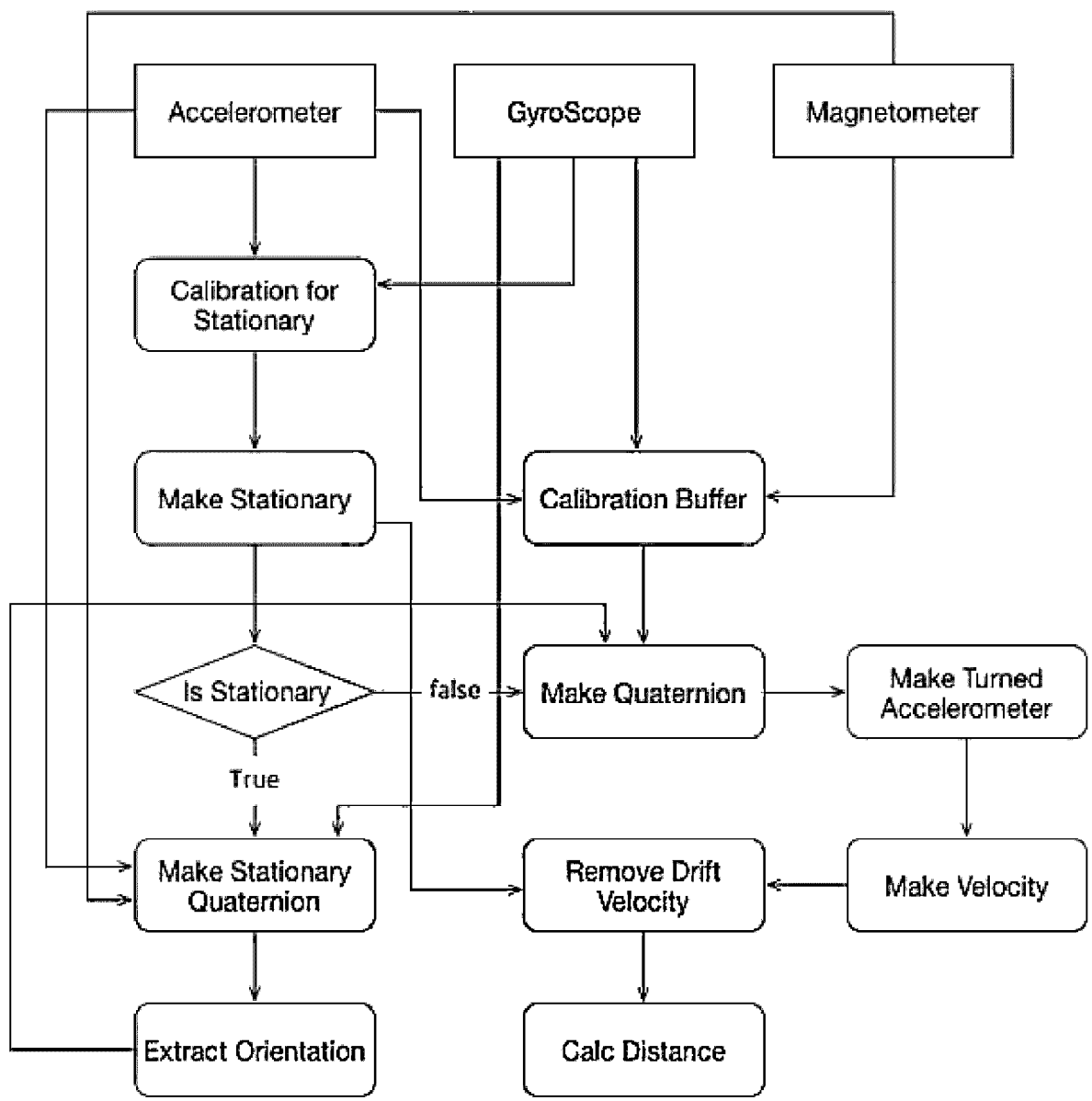
FIG. 10 is a flow chart showing a positioning method using an IMU.

FIG. 1 is a block diagram showing the electronic monitoring system according to one embodiment of the present invention, FIG. 2 is a block diagram showing the configuration of the electronic monitoring device of the electronic monitoring system according to one embodiment of the present invention, FIG. 3 is a flow chart showing a method of controlling the electronic monitoring system according to one embodiment of the present invention, FIG. 4 is a schematic diagram conceptually showing prediction of a future behavior on the basis of a user-defined behavior pattern generated in advance through deep learning using IMU positioning information as learning data, FIG. 5 is a view showing a method of providing data according to an out-of-home state or an at-home state of the electronic monitoring device in the electronic monitoring system according to the present embodiment, FIG. 6 is a view showing an example in which the electronic monitoring device acquires location information according to the source of the location information, FIG. 7 is a view showing a configuration of a data frame used for communication between each device in the electronic monitoring system according to the present embodiment, FIG. 8A is a schematic diagram explaining a data transmission method when an original frame is lost or an ACK is lost, FIG. 8B is a schematic diagram explaining a data transmission method in case of a CRC check error, FIGS. 9A and 9B are views showing a schematic appearance and an operation form of the electronic monitoring device according to the present embodiment, and FIG. 10 is a flow chart of a positioning method using an IMU, and the embodiments according to the present invention will be described with reference to the above as follows.

As shown in FIG. 1, the electronic monitoring system according to the present embodiment includes an electronic monitoring device (100), an at-home monitoring device (200), a control center (300) and a victim terminal (400).

The electronic monitoring device (100) is worn on a part of the body of a person to be monitored to acquire location information and state information. Herein, the state information may include, but is not limited to, whether the electronic monitoring device (100) is damaged, whether the case is separated, whether the strap is cut, whether it is in a locked state, whether there are a wireless connection state and a low power state, and the like.

The at-home monitoring device (200) receives the location information and the state information provided from the electronic monitoring device (100) and determines whether the electronic monitoring device (100) is at home, on the basis of the location information. The at-home monitoring device (200) is installed in the residence of a person to be monitored who wears the electronic monitoring device (100) and operates in connection with the electronic monitoring device (100). Herein, the meaning of "whether it is at home" or "at-home state" may be used as a concept that includes not only the case where a person to be monitored who wears the electronic monitoring device (100) is actually in the residence, but also the case where the person to be monitored is near from the residence or out-of-home.

The control center (300) receives the location information and the state information from at least one of the electronic monitoring device (100) or the at-home monitoring device (200) to supervise and manage the person to be monitored.

As shown in FIG. 2, the electronic monitoring device (100) includes a location detecting unit (110), a state information detecting unit (120), a battery (140), a wireless communication module (130) and a control unit (150), and as shown in FIG. 9A, it may be implemented integrally with a hardware configuration of an electronic anklet including a strap, and as shown in FIG. 9B, a charging pack implemented as a secondary battery may also be equipped as the battery (140).

The location detecting unit (110) detects the location information of the electronic monitoring device (100), and the state information detecting unit (120) detects the state information of the electronic monitoring device (100), and the battery (140) supplies an electric power source to the electronic monitoring device (100).

The control unit (150) controls the overall operation of the electronic monitoring device (100), and provides the location information and the state information to the at-home monitoring device (200) or the control center (300) through the wireless communication module (130).

When the person to be monitored who wears the electronic monitoring device (100) is out of home, the wireless communication module (130) may communicate directly with the control center (300) through IoT communication to provide the location information and the state information. On the other hand, when the person to be monitored who wears the electronic monitoring device (100) is at home, the wireless communication module (130) may communicate with the at-home monitoring device (200) through near field wireless communication, and the at-home monitoring device (200) may communicate directly with the control center (300) through IoT communication to periodically or aperiodically provide the location information and the state information.

The location detecting unit (110) of the electronic monitoring device (100) may detect GPS location information, WPS information (Wifi Position system) and cell-identifier information of a wireless communication base station as the location information. In this case, the location detecting unit (110) may set the priority in the order of GPS location information, WPS information and cell-identifier information of a wireless communication base station to provide the location information to the at-home monitoring device (200) or the control center (300), thereby providing the location information smoothly without interruption.

On the other hand, the location detecting unit (110) may further detect positioning information using an inertial measurement unit (IMU), and the control unit (150) may correct the location information based on such positioning information to increase the accuracy and reliability of the location information.

The electronic monitoring device (100) receives the location information of the victim terminal (400) from the victim terminal (400) carried by the victim, and on the basis of the location information of the electronic monitoring device (100) and the location information of the victim terminal (400), when the victim terminal (400) enters within a preset safety radius from the electronic monitoring device (100), a warning is generated. In addition, the electronic monitoring device (100) may transmit a beacon signal to generate an access danger warning through a warning sound or a warning screen in the electronic monitoring device (100) when the victim terminal (400) enters within the effective communication distance. Of course, the victim terminal (400) itself may be also configured to provide an access danger warning in the form of a warning sound or a warning screen through the same control method as in the electronic monitoring device (100) when the victim terminal (400) enters within the safety radius or enters within the effective communication distance. In addition, it may be also configured to receive access warning information from the electronic monitoring device (100) and output it through a warning sound or a warning screen.

In this case, the electronic monitoring device (100) may be connected to the victim terminal (400) through LoRa communication.

The control center (300) may detect an abnormal behavior of a person to be monitored by comparing a behavior pattern of the person to be monitored obtained on the basis of the location information with a user-defined behavior pattern generated in advance. That is, the abnormal behavior in the future may be perceived or predicted in advance through the behavior pattern estimation as shown in FIG. 4.

To this end, the electronic monitoring device (100) detects positioning information obtained using an inertial measurement unit (IMU) as the location information and provides it to the control center (300), and the control center (300) uses the positioning information as the location information for analysis of a behavior pattern of a person to be monitored. In generating a user-defined behavior pattern, the control center (300) generates a learning model using the positioning information as learning data on the basis of artificial intelligence (AI) to perform pattern matching, but generates the user-defined behavior pattern by performing deep learning through repetition of the pattern matching and analyzing the behavior pattern. The user-defined behavior pattern may be classified into, for example, walking, running, climbing stairs, lying down, riding a bicycle, and the like. In particular, the control center (300) may use a CNN (Convolution Neural Network) algorithm as a method of analyzing the behavior pattern.

The operation and action of the present embodiment configured as described above will be described in detail with reference to FIGS. 1 to 10.

First, as shown in FIG. 3, the electronic monitoring device (100) that is worn on a part of the body of a person to be monitored acquires location information and state information of the device (S301). As shown in FIG. 6, the electronic monitoring device (100) may detect GPS location information (GPS positioning information), WPS information (Wifi Position system) and cell-identifier information of a wireless communication base station as the location information. In this case, the electronic monitoring device (100) may set the priority in the order of GPS location information, WPS information and cell-identifier information of a wireless communication base station to acquire the location information, thereby providing the location information smoothly without interruption.

In addition, the electronic monitoring device (100) may be also configured to further detect positioning information using an inertial measurement unit (IMU), and to more accurately supplement or correct the location information by the positioning information. The inertial measurement unit (IMU) is a device used to control an airplane or military weapon or measure the attitude of a simulation device, and for example, it may be configured to include at least one sensor of a three-axis accelerometer sensor, a three-axis gyroscope sensor, or a three-axis geomagnetometer sensor, and it is possible to measure the acceleration in the traveling direction, lateral direction, and height direction and rolling, pitch, and yaw angular velocities. Since the obtained location information, such as GPS location information (GPS positioning information), WPS information and cell-identifier information of a wireless communication base station, has a certain level of non-negligible error, the control unit (150) may correct/supplement the location information by the obtained positioning information using an inertial measurement unit (IMU).

To briefly summarize the positioning method using the IMU, first, a vector corresponding to each sensor value obtained from an acceleration sensor, a gyro sensor, a magnetometer and the like is generated using a quaternion, and then the vector of the attitude and motion state in the previous last stationary state is synthesized, and the quaternion in an absolute coordinate system through AHRS (attitude perceive) is rotated, and the gravitational acceleration is removed from the rotated quaternion, and the migration distance is calculated through the process that detects and removes drift through the cumulative coefficient in the non-stationary state, and FIG. 10 is a flow chart showing a positioning method using an IMU.

The state information include whether the electronic monitoring device (100) is damaged, whether the case is separated, whether the strap is cut, whether it is in a locked state, whether there are a wireless connection state and a low power state, and the like, and it may be detected by a cut perception sensor (not shown), a voltage/current sensor (not shown), or the like that is provided in the electronic monitoring device (100).

FIG. 5 is a view showing a method of providing data according to an out-of-home state or an at-home state of the electronic monitoring device in the electronic monitoring system according to the present embodiment. When the electronic monitoring device (100) is at home according to the location information acquired in step (S301) ("Yes" in step (302)), the electronic monitoring device (100) transmits the location information and the state information to the at-home monitoring device (200) (S303). The at-home monitoring device (200) is installed in the residence of a person to be monitored who wears the electronic monitoring device (100) and the like, and receives the location information and the state information in connection with the electronic monitoring device (100). Herein, the meaning of "whether it is at home" or "at-home state" may be used as a concept that includes not only the case where a person to be monitored who wears the electronic monitoring device (100) is actually in the residence, but also the case where the person to be monitored is near from the residence.

In the above, the electronic monitoring device (100) communicates with the at-home monitoring device (200) through near field wireless communication, and as the near field wireless communication, in particular, ultra wide band communication (UWB) or Wi-Fi communication may be applied.

Subsequently, the at-home monitoring device (200) periodically or aperiodically transmits the location information and the state information to the control center (300) that manages the person to be monitored or a server (not shown) of the control center (300) (S304). The at-home monitoring device (200) communicates directly with the control center (300) through IoT communication to provide the location information and the state information, and the LTE Cat.M1 method may be applied as an IoT communication method.

LTE Cat.M1 is a technology standardized by 3GPP, which is an international standardization organization, and it can provide velocities of up to 1 Mbps and transmit low-capacity video and HD level photos/voices. It has characteristics that can lower the cost of manufacturing IoT devices as it has power efficiency that is tens of times higher than that of existing LTE-M, and the cost of communication modules is 30% or more cheaper. LTE Cat.M1 has a bandwidth of 1.4 MHz, supports downlink and uplink each of about 1 Mbps, and also supports handoff, so it has the advantage of being able to further diversify applications compared to NB-IoT that does not support handoff.

On the other hand, when the electronic monitoring device (100) is out of home according to the location information acquired in step (S301) ("No" in step (302)), the electronic monitoring device (100) transmits the location information and the state information directly to the control center (300) or transmits to the control center (300) via the at-home monitoring device (200) (S305). In this case, the electronic monitoring device (100) may communicate directly with the control center (300) through IoT communication or communicate with the at-home monitoring device (200) to provide the location information and the state information, and the LTE Cat.M1 method may be applied as an IoT communication method.

Next, the control center (300) detects an abnormal behavior of a person to be monitored by comparing a current behavior pattern of the person to be monitored obtained on the basis of the location information with a user-defined behavior pattern generated in advance (S306). That is, the abnormal behavior in the future may be perceived or predicted in advance through the behavior pattern estimation as shown in FIG. 4. When an abnormal behavior is detected through this, the control center (300) may generate a warning to an administrator terminal or the at-home monitoring device (200) and the like, and report the abnormal situation, thereby detecting the abnormal behavior in advance and thus preventing the occurrence of crime in advance (S307).

To this end, the electronic monitoring device (100) may detect positioning information obtained using an inertial measurement unit (IMU) as the location information and provide it to the control center (300), and the control center (300) may use the positioning information as the location information for analysis of a behavior pattern of a person to be monitored. In generating a user-defined behavior pattern, the control center (300) generates a learning model using the positioning information as learning data on the basis of artificial intelligence engine to perform pattern matching, but generates the user-defined behavior pattern by performing deep learning through repetition of the pattern matching and analyzing the behavior pattern.

In particular, the control center (300) may use a CNN (Convolution Neural Network) algorithm as a method of analyzing the behavior pattern. The CNN algorithm is a type of deep neural network (DNN), which is a neural network consisting of one or several convolutional layers and pooling layers, fully connected layers. CNN has a structure suitable for learning two-dimensional data and can be trained through a backpropagation algorithm.

On the other hand, the electronic monitoring device (100) receives the location information of the victim terminal (400) from the victim terminal (400) carried by the victim, and on the basis of the location information of the electronic monitoring device (100) and the location information of the victim terminal (400), when the victim terminal (400) enters within a preset safety radius from the electronic monitoring device (100), a warning is generated.

In this case, the electronic monitoring device (100) may be connected to the victim terminal (400) through LoRa communication. LoRa communication technology is one of the low power wide area communication (LPWA) technology that helps objects to communicate with each other, and has a characteristic capable of communicating over long distances with less power compared to other communication networks. A short range wireless communication technology that has a transmission distance of less than 100 m, such as Wi-Fi or Bluetooth, cannot transmit a small amount of data over a long distance, and the conventional mobile communication technology using an LTE module has a problem that is not appropriate because the chip price is expensive. Accordingly, in the present embodiment, LoRa communication technology with a very long transmission distance and low chip price is employed. Therefore, LoRa communication supports a distance of 15 km or more, and it is characterized in that it is resistant to noise and peripheral interference and has low power consumption. Thus, it is very suitable for communication between the electronic monitoring device (100) and the victim terminal (400) of the present embodiment.

On the other hand, the victim terminal (400) may be also configured to generate a warning by receiving the location information of the electronic monitoring device (100) and determining whether the electronic monitoring device (100) enters within a preset safety radius from the victim terminal (400) on the basis of the location information of the electronic monitoring device (100) and the location information of the victim terminal (400).

In addition, the electronic monitoring device (100) may transmit a beacon signal to generate an access danger warning through a warning sound or a warning screen in the electronic monitoring device (100) when the victim terminal (400) enters within the effective communication distance.

Of course, the victim terminal (400) itself may be implemented to provide an access danger warning in the form of a warning sound or a warning screen through the same control method as in the electronic monitoring device (100) when the victim terminal (400) enters within the safety radius or enters within the effective communication distance. In addition, it may be also implemented to receive access warning information from the electronic monitoring device (100) and output it through a warning sound or a warning screen.

In the present embodiment, the data frame used for communication between devices (an electronic monitoring device, an at-home monitoring device, a control center, and the like) has the same structure. As shown in FIG. 7, the data frame is configured to include a header including frame type information, a device identifier, a sequence area used for redundancy check purposes, a data length indicator indicating the length of a data area, a data area, and a tailor including CRC (cyclical redundancy check) information.

The header is equipped with one of an ACK frame, a NACK frame, and a DATA frame.

As shown in FIG. 8A, when a timeout occurs because an ACK frame or an original frame of a specific data frame is lost during data transmission and reception, a sender performs retransmission of the data frame, but retransmission is performed 5 times, and the timeout time is about 1 second, and when the timeout is determined, retransmission is performed immediately. In addition, if the ACK frame is lost, the original frame may have already been received. Therefore, when data is retransmitted, the receiver device checks whether or not the data frame is duplicated using the sequence area.

In addition, as shown in FIG. 8B, when the receiver detects a CRC error from the reception frame, the receiver that detected the CRC error transmits NACK instead of ACK so that the transmitter can immediately perform retransmission.

On the other hand, the electronic monitoring device (100) may be implemented integrally with a hardware configuration of an electronic anklet including a strap, as shown in FIG. 9A, and due to operation of a motor connected to a worm gear inside the electronic anklet, the length of the strap can be suitably adjusted to the body wearing part.

Since the operation of the motor is controlled by a signal from the control center (300) transmitted by the control unit (150) from the wireless communication module (130), the electronic monitoring device cannot be arbitrarily detached by the person to be monitored. On the other hand, unlike the conventional electronic monitoring device in which the control of detachment is impossible, in a situation in which the device must be detached urgently, the detachment can be immediately controlled by the control center.

As described above, the electronic monitoring system and the control method thereof according to the present embodiment is capable of effectively supervising and managing a person to be monitored by an out-of-home state and an at-home state of a person to be monitored by detecting the location of a person to be monitored and the state of an electronic monitoring device through an electronic monitoring device that is implemented integrally with an electronic anklet and the like and is worn on a part of the body of a person to be monitored. In addition, the electronic monitoring system and the control method thereof according to the present embodiment prevent the occurrence of crime in advance by analyzing the behavior pattern of a person to be monitored and detecting abnormal behavior in advance, and thus can minimize social and economic costs that may be incurred therefrom.

Although the embodiments of the present invention have been described in detail above, the scope of the present invention is not limited thereto, and various modifications and improvements of those skilled in the art using the basic concept of the present invention defined in the following claims are also within the scope of the present invention.

DESCRIPTION OF SYMBOLS

100: Electronic monitoring device
200: At-home monitoring device
300: Control center
400: Victim terminal
110: Location detecting unit
120: State information detecting unit
130: Wireless communication module
140: Battery
150: Control unit

The invention claimed is:

1. An electronic monitoring system, comprising:
an electronic monitoring device that is worn on a part of body of a person to be monitored, to acquire location information and state information;
an at-home monitoring device that receives the location information and the state information provided from the electronic monitoring device and determines whether the electronic monitoring device is at home or out of home, based on the location information;
a control center that receives the location information and the state information from at least one of the electronic monitoring device or the at-home monitoring device to manage the person to be monitored, and
a victim terminal that is carried by a victim,
wherein the electronic monitoring device receives location information of the victim terminal, and
wherein, based on the location information of the electronic monitoring device and the location information of the victim terminal, in response to the victim terminal entering within a preset radius from the electronic monitoring device, a warning signal is generated in the electronic monitoring device, or the victim terminal, or both.

2. The electronic monitoring system according to claim 1, wherein the electronic monitoring device comprises:
a location detecting unit that detects the location information of the electronic monitoring device;
a state information detecting unit that detects the state information of the electronic monitoring device;
a battery that supplies an electric power source to the electronic monitoring device;
a wireless communication module; and
a control unit that controls to provide the location information and the state information to the at-home monitoring device or the control center through the wireless communication module.

3. The electronic monitoring system according to claim 2, wherein when the person to be monitored is out of home, the wireless communication module of the electronic monitoring device transmits the location information and the state information directly to the control center through IoT communication or transmits via the at-home monitoring device, and
wherein when the person to be monitored is at home, the wireless communication module of the electronic monitoring device communicates with the at-home monitoring device through near field wireless communication, and
wherein the at-home monitoring device communicates directly with the control center through the IoT communication to provide the location information and the state information.

4. The electronic monitoring system according to claim 2, wherein the location detecting unit detects at least one of GPS location information, Wi-Fi Position System (WPS) information, or cell-identifier information of a wireless communication base station as the location information.

5. The electronic monitoring system according to claim 4, wherein the location detecting unit sets a priority in an order of the GPS location information, the WPS information and the cell-identifier information to provide the location information to the at-home monitoring device or the control center.

6. A method of controlling an electronic monitoring system, comprising:
acquiring location information and state information from an electronic monitoring device that is worn on a part of body of a person to be monitored;
determining whether the electronic monitoring device is at home or out of home;
in response to determining that the electronic monitoring device is at home, transmitting the location information and the state information from the electronic monitoring device to an at-home monitoring device; and
in response to determining that the electronic monitoring device is out of home, transmitting the location information and the state information from the electronic monitoring device to a control center directly or via the at-home monitoring device,
determining, based on location information of the electronic monitoring device and location information of a victim terminal that is carried by a victim, whether the victim terminal enters within a preset radius from the electronic monitoring device; and
in response to determining that the victim terminal is within the preset radius from the electronic monitoring device, generating a warning signal in the electronic monitoring device, or the victim terminal, or both.

7. The method of controlling an electronic monitoring system according to claim 6,
wherein when the person to be monitored is out of home, the electronic monitoring device communicates directly with the control center through IoT communication or communicates with the at-home monitoring device to provide the location information and the state information, and
wherein when the person to be monitored is at home, the electronic monitoring device communicates with the at-home monitoring device through near field wireless communication, and the at-home monitoring device communicates directly with the control center through IoT communication to provide the location information and the state information.

8. The method of controlling an electronic monitoring system according to claim 6, wherein the electronic monitoring device detects at least one of GPS location information, Wi-Fi Position System (WPS) information, or cell-identifier information of a wireless communication base station as the location information.

9. The method of controlling an electronic monitoring system according to claim 8, wherein the electronic monitoring device sets a priority in an order of the GPS location information, the WPS information, and the cell-identifier information to provide the location information to the at-home monitoring device or the control center.

* * * * *